US012623232B2

(12) United States Patent
Hasegawa et al.

(10) Patent No.: US 12,623,232 B2
(45) Date of Patent: May 12, 2026

(54) ELECTRIC DUST COLLECTOR AND DUST COLLECTION METHOD USING SAME

(71) Applicant: CREATIVE TECHNOLOGY CORPORATION, Kawasaki (JP)

(72) Inventors: Takaaki Hasegawa, Kawasaki (JP); Hiroyuki Moriyama, Kawasaki (JP)

(73) Assignee: CREATIVE TECHNOLOGY CORPORATION, Kawasaki (JP)

( * ) Notice: Subject to any disclaimer, the term of this patent is extended or adjusted under 35 U.S.C. 154(b) by 310 days.

(21) Appl. No.: 18/690,019

(22) PCT Filed: Oct. 4, 2022

(86) PCT No.: PCT/JP2022/037130
§ 371 (c)(1),
(2) Date: Mar. 7, 2024

(87) PCT Pub. No.: WO2023/058652
PCT Pub. Date: Apr. 13, 2023

(65) Prior Publication Data
US 2024/0399388 A1 Dec. 5, 2024

(30) Foreign Application Priority Data
Oct. 6, 2021 (JP) ................................ 2021-164780

(51) Int. Cl.
*B03C 3/45* (2006.01)
*B03C 3/47* (2006.01)
*B03C 3/64* (2006.01)
*B03C 3/68* (2006.01)
*B03C 3/70* (2006.01)
*B03C 3/86* (2006.01)

(52) U.S. Cl.
CPC .................. *B03C 3/47* (2013.01); *B03C 3/64* (2013.01); *B03C 3/70* (2013.01); *B03C 3/86* (2013.01)

(58) Field of Classification Search
CPC .... B03C 3/45; B03C 3/47; B03C 3/64; B03C 3/68; B03C 3/70; B03C 3/86; B03C 3/017; B03C 2201/20; Y02A 50/2351
(Continued)

(56) References Cited

U.S. PATENT DOCUMENTS 8,158,238 B2 * 4/2012 Miyashita ............ H10P 72/722 361/234
9,025,305 B2 * 5/2015 Cooke .................... B23Q 3/152 361/230
(Continued)

FOREIGN PATENT DOCUMENTS

EP 1 909 308 A1 4/2008
JP 2004-291012 A 10/2004
(Continued)

OTHER PUBLICATIONS

International Search Report (PCT/ISA/210) issued in PCT/JP2022/037130, dated Nov. 8, 2022.
(Continued)

*Primary Examiner* — Frank M Lawrence, Jr.
(74) *Attorney, Agent, or Firm* — Birch, Stewart, Kolasch & Birch, LLP

(57) ABSTRACT

Provided is an electric precipitator that collects dusty foreign matter by an electrostatic force, including: a laminated sheet at least including a dust collection layer that holds the dusty foreign matter in contact, a first electrode layer, a second electrode layer, and an insulation layer, the dust collection layer, the first electrode layer, the second electrode layer, and the insulation layer being laminated; and a power supply device that applies voltages across the first and second electrode layers. The insulation layer at least has a first insulation layer that insulates the dust collection layer and the first electrode layer, a second insulation layer that insulates the first electrode layer and the second electrode
(Continued)

layer, and a third insulation layer that insulates the second electrode layer and a portion under the second electrode layer. Films having a surface resistivity of $10^4$ to $10^8 \Omega$ are used for the first and second electrode layers.

8 Claims, 7 Drawing Sheets

(58) Field of Classification Search
USPC ............. 96/15, 55, 58, 83, 84, 88; 95/57, 63
See application file for complete search history.

(56) References Cited

U.S. PATENT DOCUMENTS

| | | | | |
|---|---|---|---|---|
| 11,823,940 | B2 * | 11/2023 | Cho | H10P 72/722 |
| 12,409,461 | B2 * | 9/2025 | Hasegawa | B03C 3/47 |
| 2007/0223173 | A1 | 9/2007 | Fujisawa et al. | |
| 2009/0040681 | A1 | 2/2009 | Fujisawa et al. | |
| 2012/0120545 | A1 | 5/2012 | Fujisawa et al. | |
| 2016/0207051 | A1 | 7/2016 | Tatsumi et al. | |
| 2021/0154680 | A1 | 5/2021 | Loreth et al. | |
| 2024/0375121 | A1 * | 11/2024 | Hasegawa | B21D 55/00 |

FOREIGN PATENT DOCUMENTS

| | | | |
|---|---|---|---|
| JP | 2005-64105 | A | 3/2005 |
| WO | WO 2005/091356 | A1 | 9/2005 |
| WO | WO 2007/066572 | A1 | 6/2007 |
| WO | WO 2015/029698 | A1 | 3/2015 |

OTHER PUBLICATIONS

Written Opinion of the International Searching Authority (PCT/ISA/237) issued in PCT/JP2022/037130, dated Nov. 8, 2022.

* cited by examiner (i)

(ii)

ELECTRIC DUST COLLECTOR AND DUST COLLECTION METHOD USING SAME

TECHNICAL FIELD

This invention relates to a field in which dusty foreign matter is emitted directly by material processing such as cutting machining, punching, or cutting, a field in which a material is scraped by a packaging machine, a baling machine, or the like, or a field in which dusty foreign matter is emitted indirectly by abrasion caused by operation of a movable part of a device, an opening/closing part of a door, or the like, and more particularly relates to an electric precipitator that can collect dust such as fine particles and small swarf/chips utilizing an electrostatic force, the dust being emitted during the stamping process using a press mold.

BACKGROUND ART

When an article to be processed (workpiece) is punched with a mold during material processing such as stamping process, dusty foreign matter such as fine particles and small swarf/chips is emitted due to, for example, friction between the punched workpiece and the mold. There is a concern that the dusty foreign matter emitted in such a situation of material processing will flow onto a workpiece surface because of an influence of airflow generated by driving, atmosphere, or heat (in the case of a mold, for example, negative pressure when the mold is opened/closed), and furthermore, that fine particles will remain floating in the air for a long time to contaminate a surrounding environment and naturally drops to adhere onto the workpiece, thus causing product failures such as dents, hollows, scratches, and interfusion during subsequent processing.

Therefore, in order to deal with the above-described failures resulting from such dusty foreign matter, a method such as attraction with magnets in a case where the dusty foreign matter is magnetic metal or removal by air suctioning, for example, have been conventionally employed.

However, the effect of application of a magnet is limitedly applicable to magnetic materials and is therefore ineffective for dusty foreign matter composed of non-magnetic metals or other materials. On the other hand, taking a forming press as an example, because of the characteristics of the forming press, a mold is in a sealed state in the instant of punching when most of the fine particles are emitted, and the pressure is negative when the mold is opened. Thus, in such a case, suctioning by air cannot be expected to exert a sufficient effect, and indeed is less effective for dust collection.

On the other hand, a method for blowing air onto dusty foreign matter to remove the dusty foreign matter by a blowing effect has also been conventionally used. Patent Literature 1, for example, proposes, in a pressing apparatus according to a technology antecedent thereto, a method such as effectively supplying compressed gas directed toward a predetermined site in order to more effectively remove dusty foreign matter accumulated between a lower mold and a knockout. Although this is relatively effective at blowing away large foreign matter, such a method by blowing air might adversely blow up and disperse fine dusty foreign matter such as fine particles in the air and therefore has a limited effect in terms of preventing adhesion to a workpiece considering fine dusty foreign matter such as fine particles as well.

Besides, a method through use of an air purifier of a filter type, an electric precipitation type, or the like, which is generally used to deal with foreign matter, requires a certain degree of size to be ensured because of the configuration of the air purifier. It is therefore difficult to install the air purifier in the inside of or in the vicinity of a material processing device such as a mold which has a limited space and particularly in the vicinity of a punching blade where a large amount of dusty foreign matter is emitted, and when installed outside the device, a sufficient effect of collecting particles (dusty foreign matter) emitted inside the device cannot be expected. In addition, even if an airflow path from the outside of the device to a place inside the device where dust is emitted is provided to collect dust, the method through use of an air purifier turns out to be similar to the above-described air suctioning and is less effective in dust collection.

In the meanwhile, as a method for attracting particles (dusty foreign matter) and collecting dust in question in a procedure of manufacturing semiconductor and liquid crystal displays, a method for collecting dust using a coulomb-type electrostatic chuck as described in Patent Literature 2, for example, has been conventionally proposed. Such a method does not have the disadvantages of the method through use of magnets and the method through use of air as described above, and enables collection of foreign matter utilizing static electricity. In such a coulomb-type electrostatic chuck in which electrodes are aligned in the horizontal direction and an electric field is thus produced in a gap between the electrodes, however, lines of electric force concentrate in the horizontal direction, and the electric field hardly spreads in the vertical direction. Therefore, such a method has little effect on attracting relatively fine dusty foreign matter such as floating fine particles, resulting in a limited effect, although the method is advantageous in terms of the effect of attracting foreign matter coming into contact with the electrodes. Moreover, since the electrodes are installed in a manner exposed to the surface in the actual method in Patent Literature 2, a method through use of a device/instrument employing this kind of configuration might cause spark discharge leading to fire in a case where a dielectric layer is broken, for example, which is problematic in terms of safety, and is therefore unsuitable for use in a material processing device such as a mold.

In addition, among electrostatic chucks, what is called a gradient-force producing type electrostatic chuck employing a configuration in which a plurality of electrode layers is laminated in the depth direction with an interelectrode insulation layer interposed therebetween in order to enhance forces for attracting and holding a target object has also been conventionally proposed (see Patent Literature 3 and Patent Literature 4, for example). Even in a case of utilizing such a gradient-force producing type electrostatic chuck, a good conductive material such as metal is generally used for electrodes to be used for efficient and prompt attraction or responding to dechuck in a conventional electrostatic chuck. However, there are concerns that a conventional electrostatic chuck in which such electrodes are used has the following problems. That is, when voltages are applied across electrode layers, an interelectrode insulation layer comes to act as a capacitor, and power storage occurs. Then, in a case where insulation between the electrodes is impaired by a scratch or the like, for example, in a power stored state, electric energy stored in the capacitor (insulation layer) discharges. This might cause processing oil or machine oil used to catch fire and cause a fire disaster particularly in such a situation in which the electrostatic chuck is used in a place inside a material processing device such as a mold or might strongly affect a human body in a case of electric shock.

Consequently, use of the configuration of a conventional electrostatic chuck directly for an electric precipitator for a device such as a press mold device has not been considered.

CITATION LIST

Patent Literature

Patent Literature 1: JP2004-291012 A
Patent Literature 2: WO2015/029698 A
Patent Literature 3: WO2005/091356 A
Patent Literature 4: WO2007/066572 A

SUMMARY OF INVENTION

Technical Problem

Thus, the inventors of the present application have earnestly studied such an electric precipitator which does not have the disadvantages of the conventional methods through use of a magnet or air, can more reliably collect even fine particles and fine particles of non-magnetic metal or the like, has excellent installability, and furthermore presents no danger such as ignition or a fire disaster even if the electric precipitator is installed in the inside of or in the vicinity of a material processing device such as a mold. As a result, the inventors have found that the electric precipitator can be accomplished particularly by using electrodes having a predetermined surface resistivity value while employing what is called the gradient-force producing type electrostatic chuck structure in which a plurality of electrode layers is laminated in the depth direction with an interelectrode insulation layer interposed therebetween, and have thereby completed the present invention.

The present invention therefore has an object to provide an electric precipitator which enables dusty foreign matter emitted in material processing such as stamping process or in other fields in which scrape and wear occur to be collected more reliably utilizing an electrostatic force and can be used safely also in a material processing device.

Solution to Problem

In other words, the following describes a summary of the present invention.

[1] An electric precipitator that collects dusty foreign matter by an electrostatic force, including:
a laminated sheet at least including a dust collection layer that holds the dusty foreign matter in contact, a first electrode layer, a second electrode layer, and an insulation layer, the dust collection layer, the first electrode layer, the second electrode layer, and the insulation layer being laminated; and
a power supply device that applies voltages across the first and second electrode layers, in which
the insulation layer at least has a first insulation layer that insulates the dust collection layer and the first electrode layer, a second insulation layer that insulates the first electrode layer and the second electrode layer, and a third insulation layer that insulates the second electrode layer and a portion under the second electrode layer, and
films having a surface resistivity of $10^4$ to $10^8\Omega$ are used for the first and second electrode layers.

[2] The electric precipitator according to [1], in which
the first electrode layer has a plurality of lost portions extending through in a thickness direction of the first electrode layer, the lost portions have an area ratio of 3% to 50% of a total area of the first electrode layer, and the first electrode layer including the lost portions is larger in top view than the second electrode layer by 2 to 10 mm at an end, and
the first and second electrode layers are laminated with an interposition of the second insulation layer in a thickness direction of the laminated sheet.

[3] The electric precipitator according to [1] or [2], in which
during use, the electric precipitator is used with a negative voltage applied to the first electrode layer and a positive voltage applied to the second electrode layer, and
in a case in which a dust collection target contains a conductor, voltages depending on distances from a dust-emitting part are applied such that $y \le 1.7x+2.2$ is satisfied where the voltage to be applied to the first electrode layer is $-y$ kilovolt (kV) and the voltage to be applied to the second electrode layer is x kilovolt (kV).

[4] The electric precipitator according to [1] or [2], in which
during use, the electric precipitator is used with a negative voltage applied to the first electrode layer and 0 V to a positive voltage applied to the second electrode layer, and
in a case in which a dust collection target does not contain a conductor, a voltage of more than or equal to 0 V is applied to the second electrode layer and a voltage depending on a distance from a dust-emitting part is applied to the first electrode layer.

[5] The electric precipitator according to [1] or [2], further including close-contact fixation means for installation and fixation in close contact with a target object.

[6] The electric precipitator according to [1] or [2], in which a resin material or a sticking material having an elastic modulus of more than or equal to 0.5 MPa and less than or equal to 10 MPa and a three-dimensional average surface roughness (SRa) of more than or equal to 0.01 μm and less than or equal to 0.55 μm is used for the dust collection layer.

[7] A method for collecting dusty foreign matter containing a conductor using the electric precipitator according to [1] or [2], in which
during use, the electric precipitator is used with a negative voltage applied to the first electrode layer and a positive voltage applied to the second electrode layer, and
voltages depending on distances from a dust-emitting part are applied such that $y \le 1.7x+2.2$ is satisfied where the voltage to be applied to the first electrode layer is $-y$ kilovolt (kV) and the voltage to be applied to the second electrode layer is x kilovolt (kV).

[8] A method for collecting dusty foreign matter not containing a conductor using the electric precipitator according to [1] or [2], in which
during use, the electric precipitator is used with a negative voltage applied to the first electrode layer and 0 V to a positive voltage applied to the second electrode layer, and
a voltage of more than or equal to 0 V is applied to the second electrode layer and a voltage depending on a distance from a dust-emitting part is applied to the first electrode layer.

Advantageous Effects of Invention

According to the present invention, an electric precipitator which enables fine particles and fine particles of non-magnetic metal or the like as dusty foreign matter emitted during material processing such as stamping process to be collected more reliably utilizing an electrostatic force, has excellent installability, and can be used safely in a material processing device can be provided. The technology of the present invention is also applicable to fields other than material processing such as, for example, a field in which a material is scraped by a packaging machine, a baling machine, or the like, and a field in which dusty foreign matter is emitted indirectly by abrasion caused by operation of a movable part of a device, an opening/closing part of a door, or the like.

DESCRIPTION OF EMBODIMENT

Figure 1:
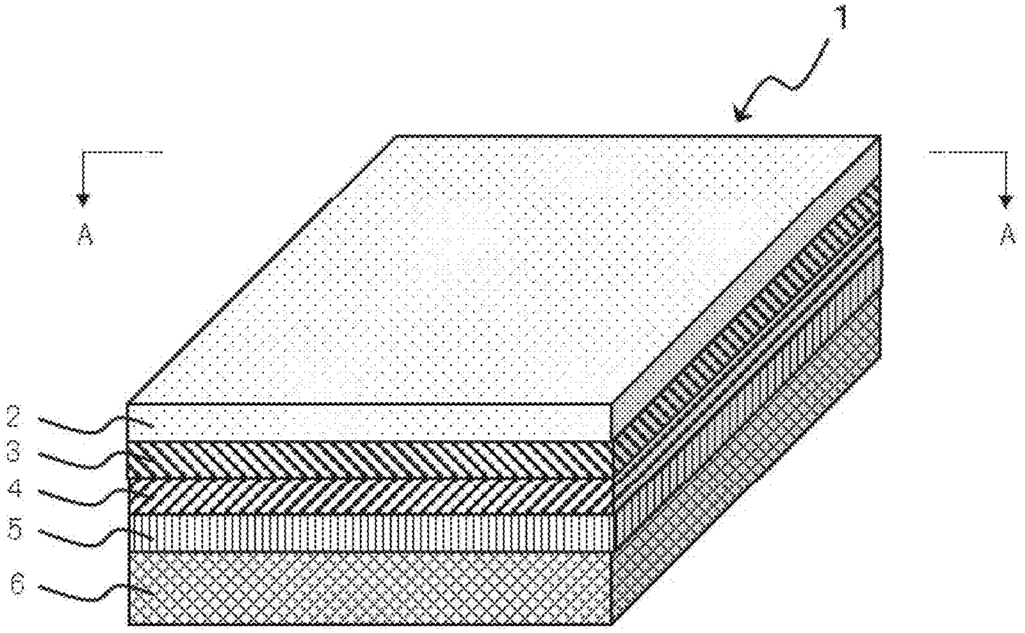
FIG. 1 FIG. 1 shows an example of an electric precipitator of the present invention, (i) showing an external perspective view and (ii) showing a cross-sectional explanatory diagram, which is part of a cross-section along line A-A in (i).
Figure 1:
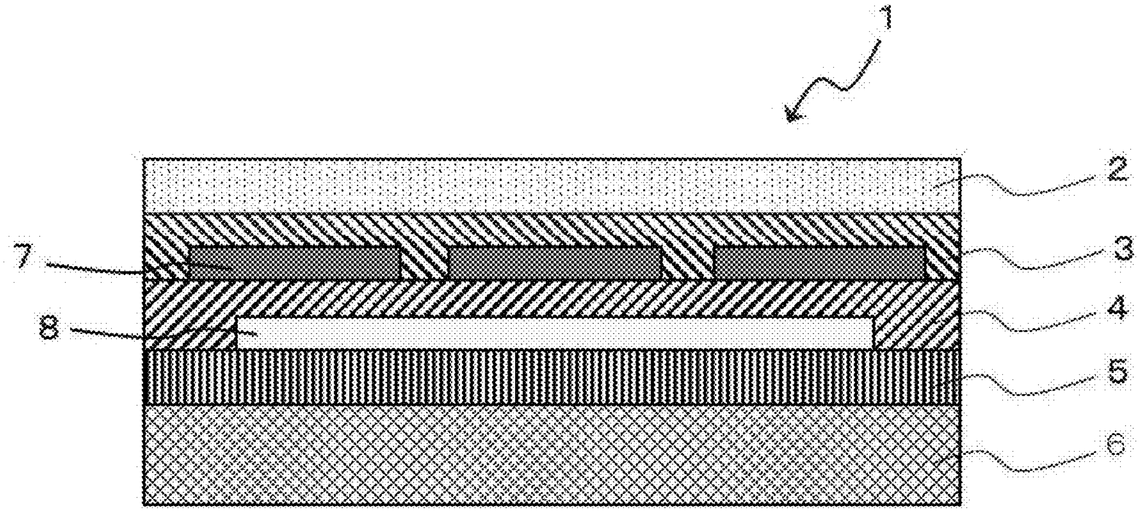

Hereinafter, the present invention will be described in detail with reference to the drawings according to necessity. Numbers represent reference characters in the drawings in some cases.

Figure 3:
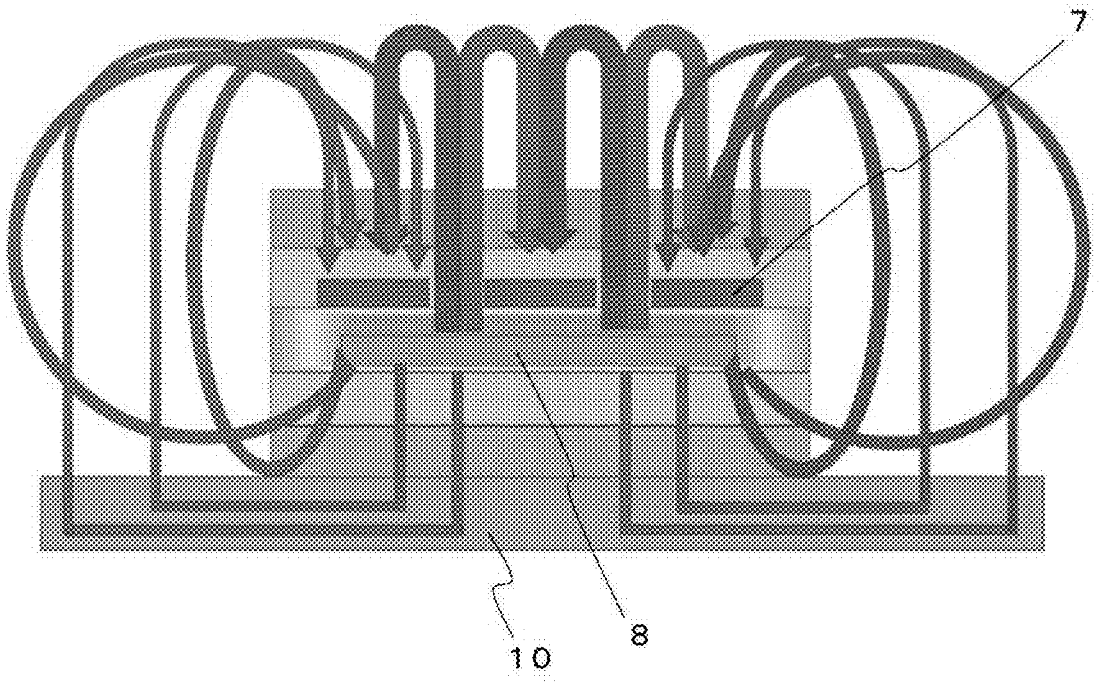
FIG. 3 is a cross-sectional view showing a manner of an electric field produced in the electric precipitator of the present invention.

An electric precipitator of the present invention includes a laminated sheet 1 at least including and obtained by laminating a dust collection layer (reference numeral 2; the same applies below), a first electrode layer 7, a second electrode layer 8, and insulation layers 3 to 5, with close-contact fixation means (for example, a close-contact fixation layer 6) used according to necessity as illustrated in FIG. 1, the close-contact fixation means being intended for close-contact installation on and fixation to a target object (which hereinafter may simply be referred to as an "installation target object" to which reference numeral 10 in FIG. 3, for example, corresponds) on which the electric precipitator is to be installed during use (note that the laminated sheet 1 will be described without differentiation from the electric precipitator in some cases). The insulation layers at least have the first insulation layer 3 that insulates the dust collection layer and the first electrode layer, the second insulation layer 4 that insulates the first electrode layer and the second electrode layer, and the third insulation layer 5 that insulates the second electrode layer and a portion under the second electrode layer as shown in the drawing. The electric precipitator further includes a power supply device (not shown) that applies voltages across the first electrode layer and the second electrode layer. Note that "the portion under the second electrode layer" described above may vary as appropriate depending on a layer configuration of the laminated sheet (electric precipitator), and, for example, refers to another configuration arranged under the second electrode layer like the above-described close-contact fixation means or in a case where such another layer is not provided, an installation target object. Thus, the third insulation layer 5 is provided for insulating the second electrode layer and such another layer or an installation target object.

<Electrode Layers>

The electrode layers to be used in the present invention at least include the first electrode layer 7 and the second electrode layer 8 as described above, and preferably, a structure in which they are laminated with an insulation layer (the second insulation layer) interposed therebetween in a thickness direction of the laminated sheet should be employed. Employment of such a laminated structure enables integration of the dust collection structure unlike conventional electric precipitators and brings an advantage in that the thickness can be reduced. Then, as the electrode layers of the present invention, films having a surface resistivity of $10^4$ to $10^8\Omega$ are used although not being limited in material, shape, or the like. Note that the unit of surface resistivity is commonly expressed as "O/sq." or the like in some cases. As the surface resistivity increases, power consumption increases, voltage drops occurs, and an attraction distance decreases. Thus, preferably, a film having a surface resistivity of $10^4$ to $10^5\Omega$, more preferably $10^4\Omega$, should be used. Since the electrode layers have such a surface resistivity, the amount of current is reduced, and power storage in the insulation layer (capacitor) significantly decreases. In addition, even in a case in which insulation is impaired by breakage of the insulation layer or the like, stored energy will pass through the surface of an electrode layer, which is a resistor, when flowing into a broken part, which can significantly lower the electric energy, enabling the risk of fire catching, an impact on human bodies, and the like to be reduced.

Herein, the material of such electrode layers of the present invention is not particularly restricted as long as it comes to have the above-described predetermined surface resistivity, but a conductive polymer having the above-described surface resistivity is suitably used, and as long as conductive polymer can be processed as it is into a desired shape, the conductive polymer processed as it is into a film shape or a film obtained by providing a support base material and coating its surface partially or entirely with the conductive polymer, or the like can be employed. As such conductive polymer, anything that comes to have a surface resistivity value as described above can be employed as appropriate. Preferable examples can include polypyrrole-based, polyacetylene-based, polythiophene-based, polyaniline-based, carbon nanotube, and other polymers. Among them, more preferably, a polypyrrole-based or polythiophene-based polymers should be used in terms of stability. Furthermore, the material to be used is not limited to only the conductive polymers described above as long as it comes to have a surface resistivity value as described above. As long as it has at least the conductive polymer described above, a form of a paint composition containing a pigment, an organic dye, or the like as commonly used in a paint together with the conductive polymer may be adopted. Note that a common coating method through use of a paint or the like can be employed as a coating method.

In the case of using a support base material, the support base material is not particularly limited, and a resin base material, rubbers, paper, or the like can be used. Because of excellent processability, a resin base material is preferably used. Resins can include polyethylene terephthalate (PET), amorphous polyethylene terephthalate (A-PET), polyethylene (PE), polystyrene (PS), polypropylene (PP), polyacetal (POM), polycarbonate (PC), ABS resin, polyacrylonitrile (PAN), polymethylmethacrylate (PMMA), polyamide 6 (PA6), polyamide 66 (PA66), polyether sulfone (PES), polyetheretherketone (PEEK), polyetherimide (PEI), polyimide (PI), and the like. Among them, PET, PC, and PP are more preferable in terms of little likelihood of occurrence of a crack during processing and processability.

Specific examples of such electrode layers of the present invention in a case where a support base material is coated with a conductive polymer can include Staclear NAS (the name of product) manufactured by Nagaoka Sangyou Co., Ltd., DAICREA (the name of product) of DAINIHON PACKAGE CORPORATION, an SCS conductive sheet manufactured by MARUAI Inc., and the like. In addition, ST-poly (the name of product) manufactured by ACHILLES CORPORATION or the like can be used as the conductive polymer.

The thickness of each of the electrode layers of the present invention having such a configuration may be adjusted as appropriate taking into account the overall configuration of the electric precipitator, applied voltages, a usage environment, and the like, and for maintaining flexibility of the laminate, 1 to 200 μm is preferable, and more preferably, 1 to 100 μm should be adopted.

Furthermore, for the shape of the electrode layers of the present invention, a configuration of a conventional electrostatic chuck having an equivalent structure can be employed as appropriate. For example, each of the electrode layers may be formed into a shape such as a flat-plate shape, a semi-circular shape, a comb-teeth shape, or a mesh shape having a plurality of lost portions (openings) extending through in the thickness direction of the electrode layer in a predetermined region. Note that the above-described lost portions may be circular or polygonal.

Figure 2:
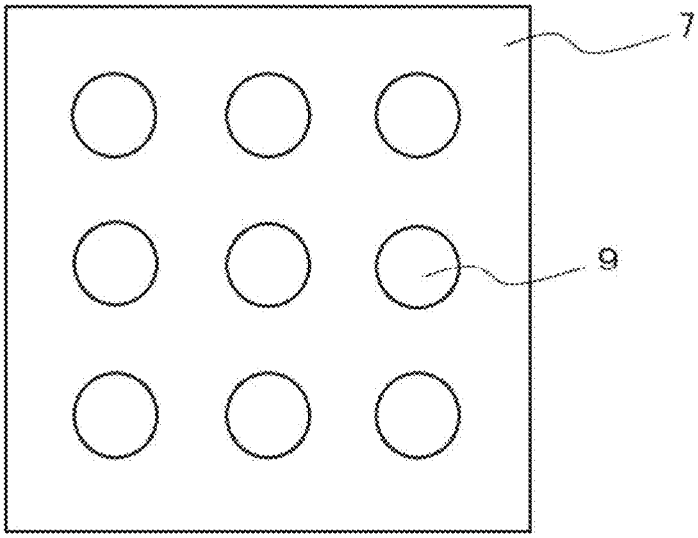
FIG. 2 is a plan view showing an example of a first electrode layer.

Among such shapes of the electrode layers, preferably, the shape of the first electrode layer 7 arranged in an upper part should be formed into a mesh-shaped electrode layer having a plurality of the above-described lost portions (openings: reference numeral 9) as shown in FIG. 2, and on the other hand, the shape of the second electrode layer 8 arranged below the first electrode layer should be formed into a flat-plate shape. At least such a combination of the shapes of the first electrode layer and the second electrode layer can moderately increase leakage of electric field from the second electrode layer, which is preferable. In this case, it is more preferable that the first electrode layer should be formed such that the lost portions have an area ratio of 3% to 45%, more preferably 3% to 50%, more preferably 10% to 45%, and still more preferably 10% to 25% of the total area of the first electrode layer. By adjusting the lost portions to have such an area ratio, a force for gripping collected dusty foreign matter is ensured, and a dust collection distance is maintained, which is preferable. Note that it is desirable that each of the lost portions should have a size of ϕ7, for example, and it is desirable that each of the lost portions should be arranged and formed uniformly in the predetermined region and formed such that energization of the first electrode layer is not interrupted.

Furthermore, it is preferable to form the first electrode layer and the second electrode layer described above such that the total area of the first electrode layer including the above-described lost portions in top view is larger than the area of the second electrode layer, that is, such that the first electrode layer has a size (area, external dimension) that can cover the second electrode layer, and it is more preferable that the first electrode layer should be formed to be larger than the second electrode layer by 2 to 10 mm from the outermost end. With such a configuration, dusty foreign matter present around the outer periphery of the first electrode layer is collected to a central part, and at the same time, the dusty foreign matter remains in the first electrode layer, which is preferable. The expression "the outermost end" as used herein shall mean that in a case of assuming that central portions (such as the center or the center of gravity, for example) of the first electrode layer and the second electrode layer are overlapped on each other, a gap on one side (any end) created by the difference in external size in top view falls within the above-described numerical range. In a case of rectangles, squares, or the like, for example, the gap refers to a gap created on each side when they are overlapped such that their centers are overlapped on each other, and in a case of circles, refers to a gap created at the end by the difference in radius. The respective shapes may be different from each other, but the meaning is similar, and it is preferable that at least the difference between ends should fall within the above-described numerical range.

A potential difference is generated between the first electrode layer and the second electrode layer in the present invention such as by applying voltages of polarities different from each other to them or by grounding one electrode and applying a positive or negative voltage to the remaining electrode, for example. On that occasion, it is preferable that appropriate adjustment should be made depending on a dust collection target object.

<Insulation Layers>

The insulation layers to be used in the present invention at least have the first insulation layer 3, the second insulation layer 4, and the third insulation layer 5 which are predetermined as shown in FIG. 1 and the like, whilst as the material of the insulation layers other than the second insulation layer 4, one or two or more kinds of resins selected from among polyimide, polyamide imide, polyester, polyethylene terephthalate, epoxy, and acrylic resin, for example, are used. Among them, preferably, polyimide should be used from the viewpoints such as insulation properties and chemical resistance. Specifically, a resin film should be used. Examples can include Kapton (the name of product manufactured by DU PONT-TORAY CO., LTD.), UPILEX (the name of product manufactured by Ube Industries, Ltd.), and the like, and Kapton made of polyimide is more preferable.

Herein, in the present invention, materials as listed for the above-described first insulation layer 3 can be used for the above-described second insulation layer 4, and preferably polyimide should be used similarly from the perspectives such as insulation properties and chemical resistance. Then, the following design idea should be reflected in this second insulation layer 4 depending on an applied voltage.

In other words, since the electric precipitator of the present invention is used in a manner attached to a material processing device such as a press mold, emission of particles due to processing such as press-punching and pulling-in of the particles by opening will be continued repeatedly and successively in many cases. The maximum effect will be exercised by continuing dust collection all the time while the material processing device is in operation. This requires a design to be used with a voltage applied for a long time. In addition, since the electric precipitator is bent and used in a shape in conformity to a processing device different from product to product, an external stress is an uncertain element. It is therefore preferable that a high factor of safety should be set at least for the second insulation layer. For example, in a case in which a potential difference between applied voltages is set at 7 kV in the electric precipitator of the present invention, it is more preferable that the material and thickness of the second insulation layer 4 should be designed at least such that the factor of safety is more than or equal to 4 at a withstand voltage of about 28 kV, and it is suitable to use a polyimide film having a base material of 75 μm, but appropriate adjustment is preferably performed depending on the applied voltages. Herein, a single film of 75 μm may be used to achieve the base material thickness of 75 μm presented as an example. Preferably, a plurality of films having a thinner thickness, such as three films of polyimide having a base material thickness of 25 μm, should be used to obtain a total of 75 μm from the viewpoints of flexibility, flex resistance, and the like. Note that the "base material" as herein referred to refers to a polyimide film itself, and in a case where a plurality of films is laminated, layers for adhesion are not included.

In addition, the configuration of the third insulation layer 5 may be the same as the configuration of the above-described first insulation layer 3 or may be set as appropriate depending on applied voltages, a power supply method, the close-contact fixation layer 6, an adhesive material at the time of assembly, and the like. Preferably, selection or the like should be made as appropriate such that the withstand voltage of the close-contact fixation layer 6 and the third insulation layer 5 together has a factor of safety of more than or equal to 5 from the viewpoint of dealing with energization of an installation place (such as a mold).

<Close-Contact Fixation Means>

In the present invention, preferably, close-contact fixation means for fixing the electric precipitator to an installation target object in close contact is preferably provided. The close-contact fixation means is not particularly restricted as long as it can fix the electric precipitator of the present invention to a target object in close contact, but the close-contact fixation layer 6 as illustrated in FIG. 1 can be suitably presented. The close-contact fixation layer 6 is a layer to come into contact with an installation place in a device such as a mold, and it is preferable that such a material for which the close contact property is secured depending on the installation place should be used. For example, in a case where the installation place is made of magnetic metal, a magnet sheet is suitably used, and in other cases of resin or non-magnetic metal, a gluing agent such as a silicone-based or acrylic gluing agent can be used alone or in combination, but this is not a limitation. Particularly in a case where the electric precipitator is installed directly in a mold in a mold application for which magnetic metal is used as the material of the mold, it is preferable to adopt a layer made of a magnet sheet as the close-contact fixation layer in order to ensure the close contact property with this magnetic metal and facilitate maintenance that requires attachment/detachment. In such a case of attachment to a narrow gap, it is more preferable to use a neodymium magnet sheet having a strong magnetic force. Since the close-contact fixation layer 6 serves to connect the electric field between the second electrode layer 8 and an installation place (such as a mold), close contact is important. It is therefore expected that generation of a line of electric force in a lateral direction will be increased and the electric field intensity will be increased by shortening of the line of electric force, enabling a stronger electric field to be generated upward (see FIG. 3 as an example). If close contact is insufficient, dust collection performance is impaired in some cases. The thickness of the close-contact fixation layer 6 can be set as appropriate within a range that does not impair the object of the present invention. In the application to a mold, for example, even in a case in which the mold is not made of magnetic metal, close contact with the mold is preferable. In that case, the material and configuration of the close-contact fixation layer can be changed as appropriate in conformity to the material of the mold such that the close contact property can be ensured.

In addition, unless machine operation is not interrupted, the electric precipitator can be brought into close contact with the mold indirectly without using the above-described close-contact fixation layer by performing incorporation such as bolting or pressing the electric precipitator from above with a frame.

<Dust Collection Layer>

In the present invention, it is preferable that the dust collection layer 2 should be a layer with which dusty foreign matter targeted for dust collection is to come into direct contact and serves to assist holding the dusty foreign matter attracted by the electrostatic force. For such dust collection layer 2, a resin material and/or a sticking material having an elastic modulus of more than or equal to 0.5 MPa and less than or equal to 10 MPa, preferably more than or equal to 2 MPa and less than or equal to 3 MPa, a three-dimensional average surface roughness (SRa) of more than or equal to 0.01 μm and less than or equal to 0.55 μm, preferably more than or equal to 0.4 μm and less than or equal to 0.5 μm should be used. Specific examples of the resin material can include silicone resin, styrene-butadiene rubber, chlorosulfonated polyethylene rubber, acrylonitrile butadiene rubber, ethylene-propylene rubber, chloroprene rubber, butadiene rubber, fluoro-rubber, isobutylene-isoprene rubber, urethane rubber, and the like. Among them, silicone resin is suitable, which is preferable because it can be expected to generate an intermolecular force (van der Waals force) with dusty foreign matter although detailed principles are not certain and because of an excellent maintenance property. Alternatively, more preferably, an adhesive material such as an adhesive tape may be provided separately together with the above-described resin material from the viewpoint of preventing re-dispersion or the like of the dusty foreign matter due to, for example, an air pressure associated with lifting and lowering of a device such as a mold. Furthermore, a support base material made of resin such as PET resin may be provided together with the resin material, the adhesive material, and the like. It is preferable that the dust collection layer 2 should have a thickness of approximately 0.1 to 0.2 mm.

<Laminated Sheet>

Then, at least the electrode layers, the insulation layers, and the dust collection layer having been described so far are used, and according to necessity, the close-contact fixation means is used, and they are laminated to obtain the laminated sheet 1 as illustrated in FIG. 1. The electrode layers are required to be sandwiched between the respective insulation layers such that the electrode layers are not exposed to the outside. Specific methods include a method for sandwiching an electrode between insulation layers and then fusing them under heat and pressure. Alternatively, a bonding sheet, an adhesive agent, or a gluing agent may be used according to necessity to cause the electrode layers and the insulation layers to adhere. Preferably, the layers should be laminated using a silicone-based adhesive agent or the like from a reason such as a low heat resisting temperature of the resin material to be used for the first electrode layer 7 and the second electrode layer 8.

Herein, as the shape of the laminated sheet 1, the flat-plate shape as shown in FIG. 1, for example, obtained by laminating the above-described materials may be used as it is, or the shape may be partially or entirely changed or processed as appropriate into a shape in conformity to a purpose depending on a usage situation, an installation place, or the like. For example, it is preferable to adopt a flat-plate shape having an entire thickness of approximately 1 mm to 5 mm or in the application to a mold or the like, a curved surface shape or a three-dimensional shape in conformity to the shape of the mold such that the laminated sheet 1 can be installed in a material processing device such as a press mold applied or a small space within the device.

<Power Supply Device>

After the laminated sheet 1 is formed as described above, a power supply device for applying voltages to the electrode layers to generate an electrostatic force is required. As the power supply device, one that can be connected to the electrodes of the above-described laminated sheet via connection terminals and a switch (neither shown) and is similar to a generally-used one can be used and should only be capable of producing a direct-current high voltage. Voltages to be generated can be set at approximately −10 kV to 5 kV. The power supply device may include a step-up circuit (high-voltage generation circuit) that enables stepping up to a required voltage according to necessity. Individual power supplies that generate a positive voltage and a negative voltage may be used in combination.

The laminated sheet 1 and the power supply device as described above are provided to obtain the electric precipitator of the present invention. The electric precipitator of the present invention may be provided separately with a sensor, an ionizing circuit, a cleaning mechanism, and the like according to necessity. Changing, adding, or the like of the configuration, such as changing of the pattern of the electrode layers, for example, may be performed as appropriate within the scope of the object of the present invention.

<Pattern of Usage>

As described above, the electric precipitator of the present invention is used together with a device such as a press mold and, for example, can collect dusty foreign matter such as fine particles emitted due to, for example, friction between a punched workpiece and a mold, for example, during stamping with the press mold. In order that the dusty foreign matter can be attracted and held more reliably on the above-described dust collection layer 2, it is preferable to adjust voltages (potential difference) to be applied to the above-described electrode layers as appropriate. The reasons are as follows: as in examples which will be described later, the inventors of the present invention presumed that a distance (an attraction distance) by which dusty foreign matter was attracted to the dust collection layer (on the electric precipitator side) substantially depended on the voltages (potential difference) to be applied to the electrode layers, and depending on electric charge and a volume resistivity of the dusty foreign matter, a phenomenon was confirmed in which dusty foreign matter, even if once attracted to the dust collection layer, was repelled without being attracted and held on the dust collection layer due to changes in charging caused by exchange of electric charge with the dust collection layer (on the electric precipitator side), kinetic energy due to an excessive coulomb force, and the like. In addition, because the electric precipitator of the present invention is supposed to adopt in many cases, the method of use in a manner attached to the vicinity of a place (dust-emitting part) at which the dusty foreign matter is emitted, the voltage to be applied to the above-described first electrode layer should be set as appropriate such that an attraction distance that can include a distance to the place (dust-emitting part) at which the dusty foreign matter is emitted can be developed. In a case in which a dust collection target is not a conductor (for example, in a case of such a dust collection target object having an electric resistivity of more than or equal to $10^4$ Ωcm) as will be understood from evaluation results in examples which will be described later, 0 volt to a positive voltage can be applied to the second electrode layer, and it is preferable that the second electrode layer should be set at 0 volt (grounded). On the other hand, in a case in which a dust collection target contains such a conductor having an electric resistivity of less than or equal to $10^4$ Ωcm, a voltage that satisfies $y \leq 1.7x+2.2$ should be applied, where the voltage to be applied to the first electrode layer is −y kilovolt (kV) and the voltage to be applied to the second electrode layer is x kilovolt (kV), in order to prevent collected dust from being repelled and re-dispersed, and it is preferable that a voltage should be applied to the second electrode layer such that the voltage to be applied to the first electrode layer becomes $y=1.7x+2.2$ which is maximum and minimizes the potential difference in terms of safety and voltage resistance.

EXAMPLES

Hereinafter, suitable embodiments of the present invention will be described specifically based on examples and comparative examples, but the present invention should not be interpreted in a manner limited by this.

<Evaluation of Attraction Performance of Electric Precipitator>

(1) Loss Rate of First Electrode Layer and CAE Analysis on Attraction Distance

In order to optimize the shape of the first electrode layer, a potential on a perpendicular from the dust collection layer of the electric precipitator and its distance were subjected to an electric field analysis using CAE analysis software (Murata Software Co., Ltd., the name of product: FEMTET) to quantify a space potential during a behavior.

A pseudo-space in which 100 mm above the upper surface of the dust collection layer 2 was imitated as an atmosphere in addition to a laminated model having a rectangular plate shape as shown in FIG. 1 was obtained as a model. The analysis was conducted as described in Table 1 applying a potential of −9 kV to the first electrode layer 7 and a potential of 2 kV to the second electrode layer 8 as input values and representing the loss rate by the lost portions (openings; the reference numeral 9) in a first electrode layer model as shown in FIG. 2.

As a result, No. 1 to No. 4 exceeded 100 mm, while the charging distance decreased in No. 5 and No. 6, and particularly in No. 6, the charging distance decreased significantly, as shown in Table 1.

TABLE 1

| No. | Loss rate of first electrode layer (%) | Charging distance at −2 kV (mm) |
|---|---|---|
| 1 | 10 | >100 |
| 2 | 12 | >100 |
| 3 | 30 | >100 |
| 4 | 45 | >100 |
| 5 | 50 | 50 |
| 6 | 55 | 36 |

(2) Difference Between Ends of First and Second Electrode Layers and CAE Analysis on Attraction Distance In order to optimize the shape of the first electrode layer, a potential on a perpendicular from the dust collection layer of the electric precipitator and its distance were subjected to an electric field analysis using CAE analysis software (Murata Software Co., Ltd., the name of product: FEMTET) to quantify a space potential during a behavior.

A pseudo-space in which 100 mm above the upper surface of the dust collection layer 2 was imitated as an atmosphere in addition to a laminated model as shown in FIG. 1 was obtained as a model. The analysis was conducted as described in Table 2 applying a potential of −9 kV to the first electrode layer 7 and a potential of 2 kV to the second electrode layer 8 as input values, and using a dimensional difference (gap) made between an end of the first electrode layer 7 and an end of the second electrode layer 8 corresponding to the end as a one-side end difference assuming a case in which the first electrode layer 7 and the second electrode layer 8 were overlapped on each other at the center.

As a result, No. 1 to No. 4 satisfied the target value of 50 mm, while No. 5 and No. 6 were shortfalls as shown in Table 2.

TABLE 2

| No. | One-side end difference between first and second electrode layers | Charging distance at −2 kV (mm) |
|---|---|---|
| 1 | 10.0 mm | >100 |
| 2 | 7.5 mm | >100 |
| 3 | 5.0 mm | >100 |
| 4 | 2.0 mm | 53 |
| 5 | 0 mm | 32 |
| 6 | −5.0 mm | 18 |

<Production of Electric Precipitator>

First, an electric precipitator was produced using the respective materials having the shapes as shown in FIG. 1 and laminating them in the order from the upper layer with a laminator. Adhesion of the respective layers was conducted using a silicone-based gluing agent of a polyimide film adhesive tape.

For the dust collection layer 2, a PET film having a thickness of 0.1 mm coated with silicone resin having a thickness of 0.1 mm (manufactured by CREATIVE TECHNOLOGY CO., the name of product: Ionpad) (a total thickness of 0.2 mm) was cut out into a square of 50 mm on one side and used.

In order to ensure an insulation property between the dust collection layer 2 and the first electrode layer 7, a polyimide adhesive tape (Teraoka Seisakusho co., Ltd., the name of product: 760H #25) having a base material thickness of 0.025 mm was cut out into a square of 50 mm on one side and laminated as the first insulation layer 3.

In Evaluations (1) and (2) which will be described later, a film (DAINIHON PACKAGE CORPORATION, the name of product: DAICREA DC-AN10$^4$) having a thickness of 0.050 mm obtained by coating a PET base material with a conductive paint through use of a polythiophene-based conductive polymer at 1.6x10$^4$Ω was used as the material of the first electrode layer 7. In addition, in Evaluation (2) which will be described later, a film (MARUAI Inc., the name of product: SCS·V) having a thickness of 0.5 mm obtained by coating a PET base material with a conductive paint containing carbon nanotubes at 1.5x10$^7$Ω was also used as the material of the first electrode layer 7. Each of these films was cut out into a square of 40 mm on one side. A plurality of 7-mm-diameter circles was uniformly hollowed to provide lost portions (openings: the reference numeral 9) and was subjected to processing such that the area proportion of the lost portions was about 12% (Table 1, No. 2) of the total area of the first electrode layer to obtain the first electrode layer 7, which was bonded to the inner side by 5 mm from each side of the dust collection layer. In addition, a copper foil tape (not shown) was pasted at corners and bonded to protrude from the dust collection layer.

As the second insulation layer 4 for insulating the first electrode layer 7 and the second electrode layer 8, a polyimide film having a total thickness of 0.075 mm of a base material obtained by laminating a polyimide adhesive tape (Teraoka Seisakusho co., Ltd., the name of product: 760H #25) having a base material thickness of 0.025 mm and two polyimide adhesive tapes (Okamoto Industries, Inc., the name of product: 1030E) into three layers was used.

In Evaluations (1) and (2) which will be described later, a film (DAINIHON PACKAGE CORPORATION, the name of product: DAICREA DC-AN10$^4$) having a thickness of 0.050 mm obtained by coating a PET base material with a conductive paint through use of a polythiophene-based conductive polymer at 1.6x10$^4$Ω was used as the material of the second electrode layer 8. In Evaluation (2) which will be described later, a film (MARUAI Inc., the name of product: SCS-V) having a thickness of 0.5 mm obtained by coating a PET base material with a conductive paint containing carbon nanotubes at 1.5x10$^7$Ω was also used as the material of the second electrode layer 8. Each of these films was cut out into a square of 30 mm on one side to obtain the second electrode layer 8. This second electrode layer 8 had an area of 400 mm$^2$, which was smaller than the total area (900 mm$^2$) of the above-described first electrode layer 7 including the lost portions, and was arranged to be located on the inner side by 5 mm from each side of the first electrode layer 7. In addition, a copper foil tape (not shown) was pasted at corners and bonded to protrude from the dust collection layer.

As the third insulation layer 5 for insulating the second electrode layer 8 and the close-contact fixation layer 6 as the close-contact fixation means, a polyimide adhesive tape (Teraoka Seisakusho co., Ltd., the name of product: 760H #25) having a base material thickness of 0.025 mm and a polyimide adhesive tape (Okamoto Industries, Inc., the name of product: 1030E) were overlapped and used.

As the close-contact fixation layer 6 as the close-contact fixation means, a neodymium magnet sheet having a thickness of 0.6 mm (manufactured by Niroku seisakusho Co., Ltd., the name of product: RSN09) was used.

They were laminated to obtain the laminated sheet 1, which was cut out into a square of 50 mm on one side to be outside by 5 mm from each side of the first electrode layer 7.

A power supply device for applying voltages to this produced laminated sheet 1 was prepared as will be described below. First, a connector-equipped voltage-resistant cable (manufactured by NISSEI ELECTRIC CO., LTD., the name of product: RSU-DC10 KV-22) was soldered to a copper foil tape (not shown). The copper foil tape was pasted to a copper foil tape (not shown) bonded to the above-described electrode corners and was subjected to insulation processing with an insulation tape. Next, the above-described connector portions were connected respectively to a first electrode layer as a negative electrode and a second electrode layer as a positive electrode of a power supply device [a power supply device including a direct-current high-voltage generation device, a power feeding cable, and a 100 VAC power supply] (not shown) to obtain an electric precipitator for test to be used in subsequent tests.

<Evaluation of Attractive Property of Electric Precipitator>

(1) Voltage Application and Evaluation of Attraction Distance

Figure 4:
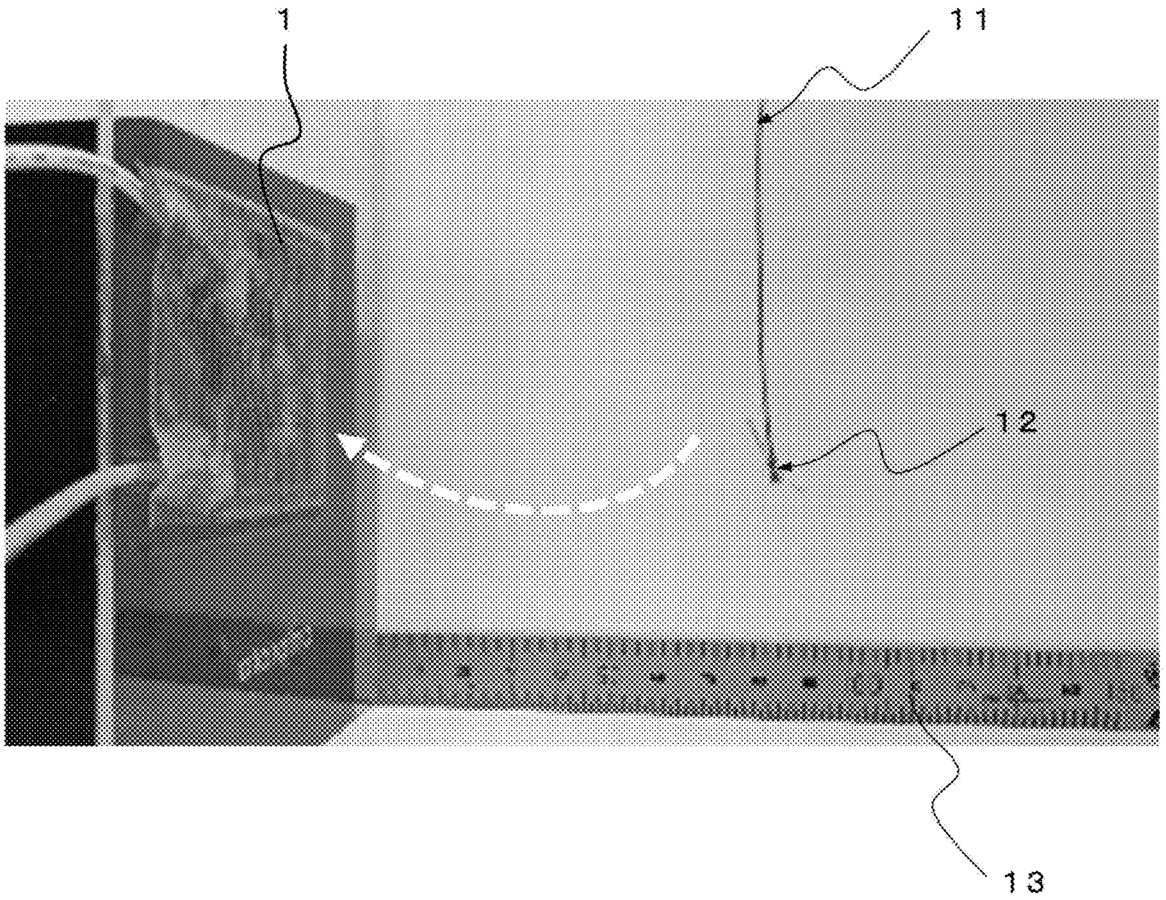
FIG. 4 is a photograph illustrating evaluations of an attraction property of an electric precipitator in an example, a blank arrow in the drawing showing a direction in which an aluminum piece 12 hung on a copper wire 11 is attracted to the electric precipitator.

As shown in FIG. 4, voltages as described in Table 3 were applied respectively to the first electrode layer and the second electrode layer of an electric precipitator erected such that the laminated sheet 1 portion is vertical to a floor surface.

Then, each sample of the aluminum piece 12 (approximately 10 mm×1 mm) and soft polyvinyl chloride (PVC) (ACHILLES CORPORATION, Seiden Crystal 0.1 having a thickness of 0.1 mm), polyurethane (PU) (Seedom Co., Ltd. Higress DUS202-CDR having a thickness of 0.1 mm), and polyimide (PI) (Ube Industries, Ltd. UPILEX 25S having a thickness of 25 μm), each being cut into 10 mm×5 mm, hung using the copper wire 11 which was extremely thin at an interval (an attraction distance) on the dust collection layer 2 side of the electric precipitator, was evaluated as to whether dust collection was performed by the electric precipitator. The attraction distance was visually measured using a metallic scale 13 installed at a lower part.

Figure 6:
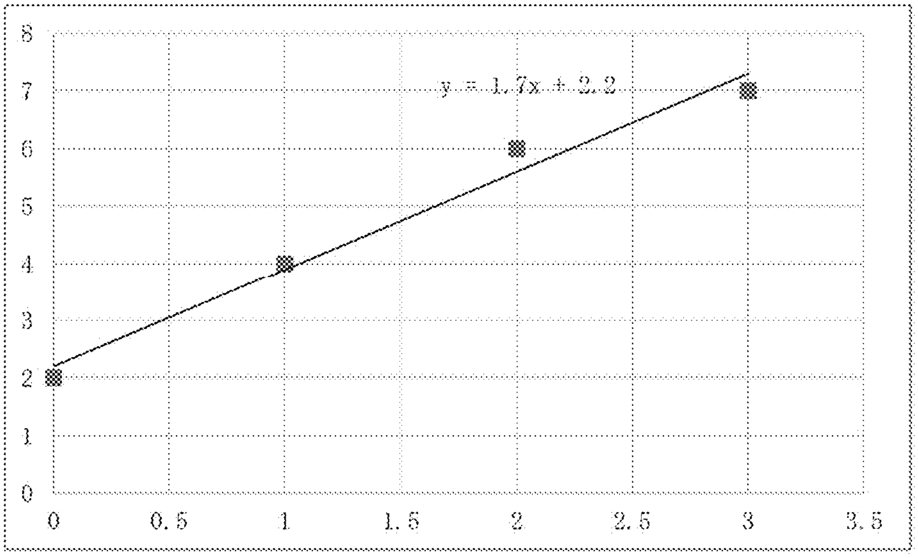
FIG. 6 is a graph plotting the absolute value of a minus voltage applied to the first electrode layer on the vertical axis and the maximum applied voltage at which an aluminum piece is not repelled on the horizontal axis as a plus voltage applied to the second electrode layer based on a result shown in Table 3.

As a result, it was appreciated that aluminum pieces were attracted to the dust collection layer but some were repelled in some cases as shown in Table 3. The graph of FIG. 6 plots a negative voltage (absolute value) applied to the first electrode layer on the vertical axis and the maximum applied voltage at which an aluminum piece is not repelled as a positive voltage applied to the second electrode layer on the horizontal axis. When applied voltages are set such that $y=1.7x+2.2$ holds as indicated by the expression in the graph, the aluminum piece is not repelled, and the potential difference is minimized.

On the other hand, since PVC, PU, and PI which were insulating materials were collected to the dust collection layer portion and remained adsorbed as shown in Table 4, it is appreciated that the second electrode layer should be grounded.

Note that it was appreciated that there was little difference in attraction distance between an aluminum piece which was a conductor and PVC, PU, are PI which were insulators.

TABLE 3

| Second electrode layer Applied voltage (x) (kV) | First electrode layer Applied voltage (−y) (kV) | Aluminum piece Attraction distance (mm) | Dust repelling |
|---|---|---|---|
| 0 | −1 | 10 | — |
| 0 | −2 | 30 | — |
| 0 | −3 | 40 | Dust was repelled |
| 0 | −4 | 50 | Dust was repelled |
| 0 | −5 | 60 | Dust was repelled |
| 0 | −6 | 65 | Dust was repelled |

TABLE 3-continued

| Second electrode layer Applied voltage (x) (kV) | First electrode layer Applied voltage (−y) (kV) | Aluminum piece Attraction distance (mm) | Dust repelling |
|---|---|---|---|
| 0 | −7 | 70 | Dust was repelled |
| 0 | −8 | 75 | Dust was repelled |
| 0 | −9 | 75 | Dust was repelled |
| 0 | −10 | 80 | Dust was repelled |
| 1 | −1 | 15 | — |
| 1 | −2 | 35 | — |
| 1 | −3 | 45 | — |
| 1 | −4 | 55 | — |
| 1 | −5 | 65 | Dust was repelled |
| 1 | −6 | 70 | Dust was repelled |
| 2 | −2 | 35 | — |
| 2 | −3 | 40 | — |
| 2 | −4 | 50 | — |
| 2 | −5 | 60 | — |
| 2 | −6 | 65 | — |
| 2 | −7 | 75 | Dust was repelled |
| 3 | −3 | 35 | — |
| 3 | −4 | 45 | — |
| 3 | −5 | 50 | — |
| 3 | −6 | 60 | — |
| 3 | −7 | 75 | — |
| 3 | −8 | 80 | Dust was repelled |

TABLE 4

| Second electrode layer Applied voltage (kV) | First electrode layer Applied voltage (kV) | PVC Attraction distance (mm) | PU Attraction distance (mm) | PI Attraction distance (mm) |
|---|---|---|---|---|
| 0 | −1 | 10 | 10 | 10 |
| 0 | −2 | 30 | 30 | 30 |
| 0 | −3 | 35 | 35 | 35 |
| 0 | −4 | 45 | 45 | 50 |
| 0 | −5 | 50 | 55 | 60 |
| 0 | −6 | 60 | 65 | 70 |
| 0 | −7 | 65 | 70 | 80 |
| 0 | −8 | 75 | 75 | 85 |
| 0 | −9 | 75 | 75 | 85 |
| 0 | −10 | 80 | 80 | 90 |
| 1 | −1 | 15 | 15 | 15 |
| 1 | −2 | 25 | 25 | 30 |
| 1 | −3 | 30 | 35 | 35 |
| 1 | −4 | 40 | 40 | 45 |
| 1 | −5 | 50 | 50 | 55 |
| 1 | −6 | 60 | 60 | 65 |

(2) Surface Resistivity of Electrodes and Evaluation of Attraction Distance

As shown in FIG. 4, voltages as described in Table 5 were applied respectively to the first electrode layer and the second electrode layer of an electric precipitator erected such that the laminated sheet 1 portion was vertical to a floor surface.

Then, each sample of an aluminum foil (Al) (MA Aluminum Co., Ltd., Nippaku Foil) and polyimide (PI) (Ube Industries, Ltd., UPILEX 25S), each cut into 10 mm×5 mm and hung using the copper wire 11 which was extremely thin at an interval (an attraction distance) on the dust collection layer 2 side of the electric precipitator, was evaluated as to whether dust collection was performed by the electric precipitator. The attraction distance was visually measured using a metallic scale 13 installed at a lower part.

As a result, it was appreciated that the dust collection function was exerted even when the surface resistivity value was high as shown in Table 5. There was a tendency that the attraction distance at high voltage was shorter as the surface resistivity value increased.

TABLE 5

| Second electrode layer Applied voltage (kV) | First electrode layer Applied voltage (kV) | Surface resistivity of electrode layers $1.6 \times 10^4$ (Ω) | | Surface resistivity of electrode layers $1.5 \times 10^7$ (Ω) | |
|---|---|---|---|---|---|
| | | Al Attraction distance (mm) | PI Attraction distance (mm) | Al Attraction distance (mm) | PI Attraction distance (mm) |
| 0 | 1 | 10 | 10 | 10 | 10 |
| 0 | 3 | 35 | 35 | 35 | 35 |
| 0 | 5 | 50 | 60 | 45 | 45 |
| 0 | 7 | 65 | 80 | 60 | 60 |
| 0 | 9 | 75 | 85 | 65 | 65 |
| 1 | 1 | 15 | 15 | 10 | 10 |
| 1 | 3 | 30 | 35 | 35 | 35 |
| 1 | 5 | 50 | 55 | 50 | 55 |

(3) Evaluation of Dust Collection Effect in Press Mold

Figure 5:
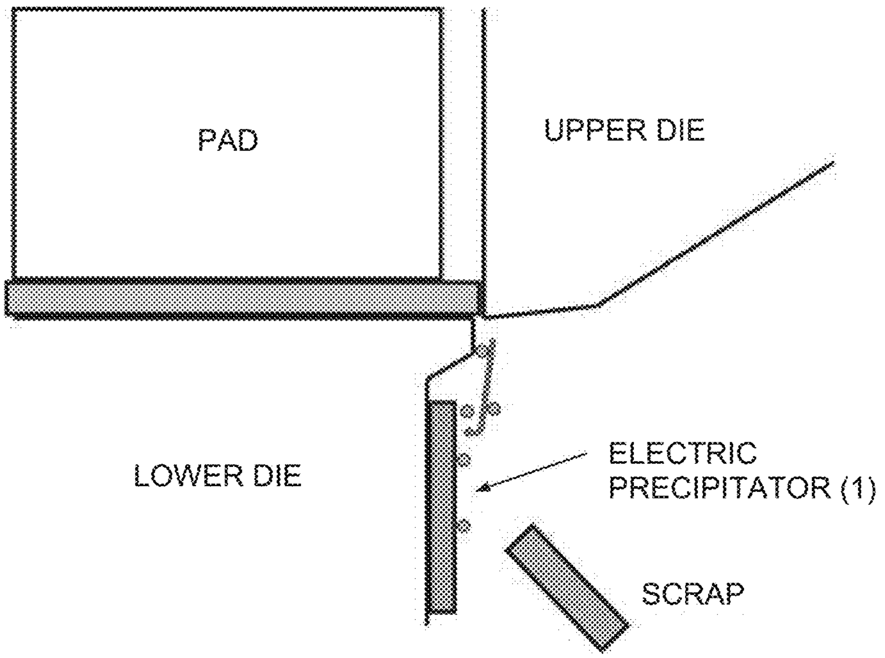
FIG. 5 is a schematic explanatory diagram illustrating how the electric precipitator of the present invention is installed in a press mold (a place in proximity to a material-cutting steel material in a lower die) and evaluated.

A dust collection effect on an aluminum piece (having an indeterminate shape but having a rough diameter of approximately 0.1 mm to 2.0 mm) which was dusty foreign matter produced when the above-described electric precipitator for test was installed in a press mold (a place in proximity to a material-cutting steel material in a lower die) and cutting was conducted using an aluminum material as a workpiece was evaluated. A schematic diagram is shown in FIG. 5.

(4) Evaluation of Dust Collection Effect in Bag Making Machine

Figure 7:
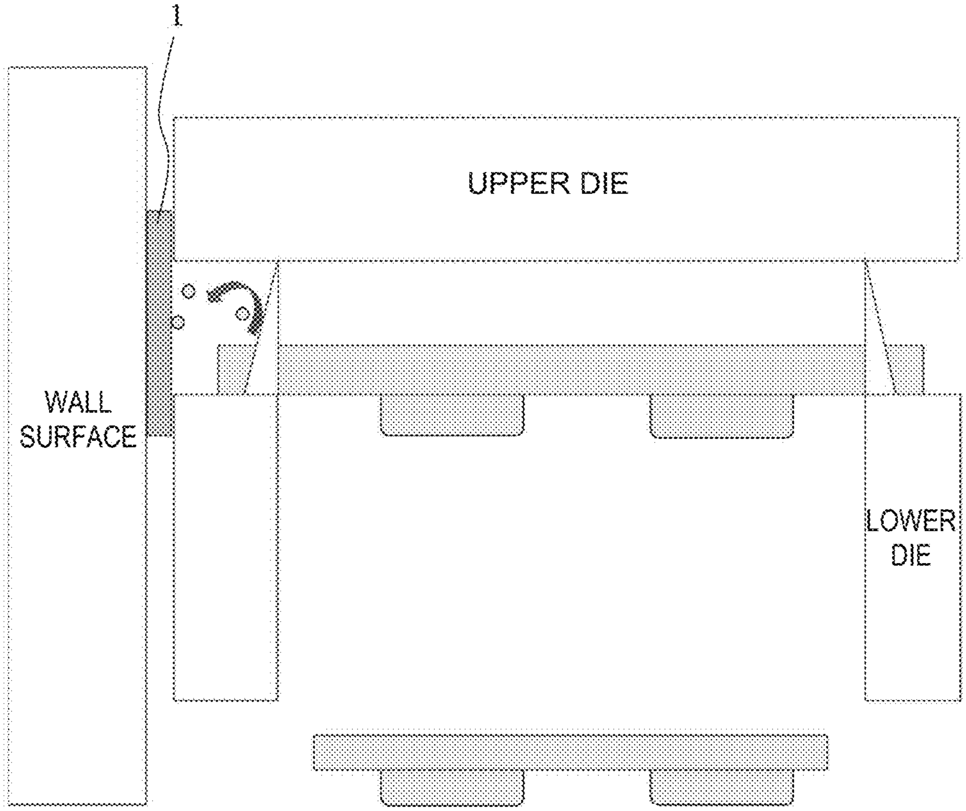
FIG. 7 is a schematic explanatory diagram describing a manner in which the electric precipitator of the present invention is installed in a bag making machine (on a wall surface in proximity to a punching die of a blister packaging machine) and evaluated.

The above-described electric precipitator for test was installed in a blister packaging machine (on a device wall surface in proximity to a punching die), and the dust collection effect on a resin-aluminum laminate (having an indeterminate shape but having a rough diameter of approximately 0.1 mm) which was dusty foreign matter produced when a laminate material of a resin sheet and an aluminum foil was used as a workpiece and subjected to cutting was evaluated. A schematic diagram is shown in FIG. 7.

Figure 8:
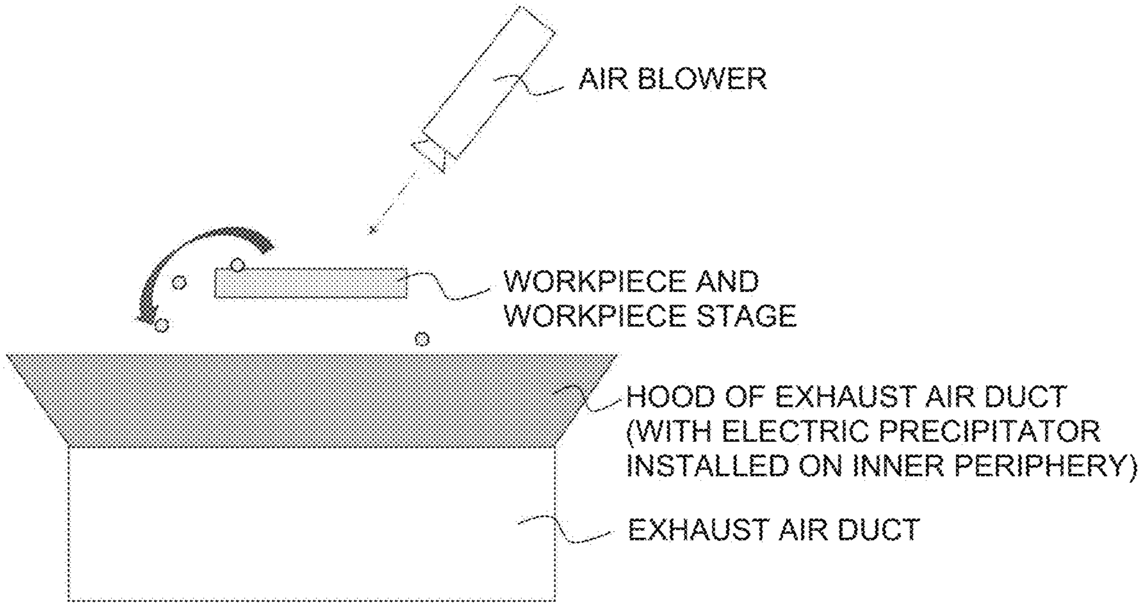
FIG. 8 is a schematic explanatory diagram describing a manner in which the electric precipitator of the present invention is installed in a semiconductor post-process device (on an inner periphery of a hood of an exhaust air duct in an air blow cleaning part) and evaluated.

(5) Evaluation of Dust Collection Effect of Air Blow Exhaust Air Part of Semiconductor Post-Process Device The above-described electric precipitator for test was installed in a semiconductor post-process device (on an inner periphery of a hood of an exhaust air duct in an air blow cleaning part), and the dust collection effect and a re-dispersion prevention effect on dusty foreign matter (approximately 0.001 mm) produced in steps, such as wafer pieces (semiconductor), metal scraps (conductor) of a wire bond, and resin scraps (insulating material) of a package, were evaluated. A schematic diagram is shown in FIG. 8.

REFERENCE SIGNS LIST

1 laminated sheet (electric precipitator), 2 dust collection layer, 3 first insulation layer, 4 second insulation layer, 5 third insulation layer, 6 close-contact fixation layer (close-contact fixation means), 7 first electrode layer, 8 second electrode layer, 9 lost portion (opening), 10 installation target object, 11 copper wire, 12 aluminum piece, 13 scale

The invention claimed is:

1. An electric precipitator that collects dusty foreign matter by an electrostatic force, comprising:

a laminated sheet at least including a dust collection layer that holds the dusty foreign matter in contact, a first electrode layer, a second electrode layer, and an insulation layer, the dust collection layer, the first electrode layer, the second electrode layer, and the insulation layer being laminated; and a power supply device that applies voltages across the first and second electrode layers, wherein the insulation layer at least has a first insulation layer that insulates the dust collection layer and the first electrode layer, a second insulation layer that insulates the first electrode layer and the second electrode layer, and a third insulation layer that insulates the second electrode layer and a portion under the second electrode layer, and films having a surface resistivity of $10^4$ to $10^8$Ω are used for the first and second electrode layers.

2. The electric precipitator according to claim 1, wherein the first electrode layer has a plurality of lost portions extending through in a thickness direction of the first electrode layer, the lost portions have an area ratio of 3% to 50% of a total area of the first electrode layer, and the first electrode layer including the lost portions is larger in top view than the second electrode layer by 2 to 10 mm at an end, and the first and second electrode layers are laminated with an interposition of the second insulation layer in a thickness direction of the laminated sheet.

3. The electric precipitator according to claim 1, wherein during use, the electric precipitator is used with a negative voltage applied to the first electrode layer and a positive voltage applied to the second electrode layer, and in a case in which a dust collection target contains a conductor, voltages depending on distances from a dust-emitting part are applied such that $y \leq 1.7x+2.2$ is satisfied where the voltage to be applied to the first electrode layer is −y kilovolt (kV) and the voltage to be applied to the second electrode layer is x kilovolt (kV).

4. The electric precipitator according to claim 1, wherein during use, the electric precipitator is used with a negative voltage applied to the first electrode layer and 0 V to a positive voltage applied to the second electrode layer, and in a case in which a dust collection target does not contain a conductor, a voltage of more than or equal to 0 V is applied to the second electrode layer and a voltage depending on a distance from a dust-emitting part is applied to the first electrode layer.

5. The electric precipitator according to claim 1, further comprising close-contact fixation means for installation and fixation in close contact with a target object.

6. The electric precipitator according to claim 1, wherein a resin material or a sticking material having an elastic modulus of more than or equal to 0.5 MPa and less than or equal to 10 MPa and a three-dimensional average surface roughness (SRa) of more than or equal to 0.01 μm and less than or equal to 0.55 μm is used for the dust collection layer.

7. A method for collecting dusty foreign matter containing a conductor using the electric precipitator according to claim 1, wherein during use, the electric precipitator is used with a negative voltage applied to the first electrode layer and a positive voltage applied to the second electrode layer, and voltages depending on distances from a dust-emitting part are applied such that $y \leq 1.7x+2.2$ is satisfied where the voltage to be applied to the first electrode layer is −y kilovolt (kV) and the voltage to be applied to the second electrode layer is x kilovolt (kV).

8. A method for collecting dusty foreign matter not containing a conductor using the electric precipitator according to claim 1, wherein during use, the electric precipitator is used with a minus voltage applied to the first electrode layer and 0 V to a plus voltage applied to the second electrode layer, and a voltage of more than or equal to 0 V is applied to the second electrode layer and a voltage depending on a distance from a dust-emitting part is applied to the first electrode layer.

* * * * *